(12) United States Patent
Kames et al.

(10) Patent No.: US 10,179,664 B2
(45) Date of Patent: Jan. 15, 2019

(54) DISPENSING CANISTERS FOR PACKAGING ORAL SOLID PHARMACEUTICALS VIA ROBOTIC TECHNOLOGY ACCORDING TO PATIENT PRESCRIPTION DATA

(71) Applicant: MTS Medication Technologies, Inc., St. Petersburg, FL (US)

(72) Inventors: Edward D Kames, Tarpon Springs, FL (US); Robert Barrett, Treasure Island, FL (US)

(73) Assignee: MTS Medication Technologies, Inc., St. Petersburg, FL (US)

( * ) Notice: Subject to any disclaimer, the term of this patent is extended or adjusted under 35 U.S.C. 154(b) by 423 days.

(21) Appl. No.: 14/533,962

(22) Filed: Nov. 5, 2014

(65) Prior Publication Data

US 2016/0122045 A1 May 5, 2016

(51) Int. Cl.
*B65B 5/10* (2006.01)
*B65B 37/04* (2006.01)
(Continued)

(52) U.S. Cl.
CPC .............. *B65B 5/105* (2013.01); *B65B 5/103* (2013.01); *B65B 37/04* (2013.01); *A61J 1/03* (2013.01); *B25J 9/1687* (2013.01)

(58) Field of Classification Search
CPC ......... B65B 5/103; B65B 5/105; B65B 37/04; B65B 35/18; B25J 9/1687; B65D 25/04;
(Continued)

(56) References Cited

U.S. PATENT DOCUMENTS 2,117,685 A * 5/1938 Smith, Jr. .............. B65D 83/04
221/185
2,177,863 A * 10/1939 Cadden .............. B65D 83/0409
221/246
(Continued)

FOREIGN PATENT DOCUMENTS

EP 2 062 822 A1 5/2009
WO WO 2008/031213 A1 3/2008
(Continued)

OTHER PUBLICATIONS

International Application No. PCT/US15/58875, International Search Report and Written Opinion dated Mar. 2, 2016, 7 pages.
(Continued)

*Primary Examiner* — Hemant M Desai
*Assistant Examiner* — Eduardo R Ferrero
(74) *Attorney, Agent, or Firm* — Kilpatrick Townsend & Stockton

(57) ABSTRACT

Robotic pick-and-place automation is used to transfer oral solid pharmaceuticals from moveable trays or canisters. Sensors are used to verify that the pharmaceuticals have been properly placed in the desired pharmaceutical locations precisely according to the patient prescription data. A pharmacist places pharmaceutical products within dispensing trays or canisters to present the pharmaceutical products for picking and placing via the robotic pick-and-place machinery. Once the canister or tray is located adjacent the pick-and-place device, a sensor or imaging unit associated with the pick-and-place device verifies that the pharmaceutical product the size, shape, and/or color of an expected pharmaceutical product that is to be placed within the packaging material in accordance with patient prescription data stored by a computer associated with the system. Sensors verify that each individual pharmaceutical specified by a patient
(Continued)

prescription have been deposited into each specified location strictly in accordance with the patient prescription data.

15 Claims, 7 Drawing Sheets

(51) Int. Cl.
    *A61J 1/03* (2006.01)
    *B25J 9/16* (2006.01)
(58) Field of Classification Search
    CPC ............ B65D 1/24; B65D 2543/00444; B65D 2543/00453; B65D 2543/00462; B65D 2543/00953; B65D 2555/00; B65D 2547/04; B65D 2547/06; B65D 2547/063; G07F 11/48; G06F 19/3462; A61J 1/03
    USPC ....... 220/555, 553, 526, 525, 524, 523, 529, 220/531; 53/411, 246; 700/242, 243
    See application file for complete search history.

(56) References Cited

U.S. PATENT DOCUMENTS

| | | | | |
|---|---|---|---|---|
| 2,774,175 | A * | 12/1956 | Maddocks | A01M 23/18 43/61 |
| 2,782,966 | A * | 2/1957 | Wiedenmeier | A47G 19/34 222/455 |
| 3,007,595 | A * | 11/1961 | Remley | A47J 37/10 220/318 |
| 3,633,732 | A | 1/1972 | Russell et al. | |
| 3,677,437 | A | 7/1972 | Haigler | |
| 3,896,968 | A * | 7/1975 | Pehr | B65D 83/0427 206/535 |
| 3,991,908 | A * | 11/1976 | Thomas | B65D 83/0409 221/154 |
| 4,209,114 | A * | 6/1980 | Wilson | B65D 47/305 222/536 |
| 4,238,902 | A * | 12/1980 | Holl | A01M 23/18 43/61 |
| 4,301,942 | A * | 11/1981 | Kupperman | A47G 19/2205 215/13.1 |
| 4,616,752 | A * | 10/1986 | Ridgley | A61J 1/03 206/521 |
| 4,776,501 | A * | 10/1988 | Ostrowsky | B65D 47/2006 215/235 |
| 4,809,880 | A * | 3/1989 | Stein | B65G 47/1492 193/2 B |
| 4,964,495 | A * | 10/1990 | Rasmussen | G07D 3/00 194/344 |
| 5,408,443 | A * | 4/1995 | Weinberger | G06F 19/3462 368/10 |
| 5,429,551 | A * | 7/1995 | Uecker | G07D 3/00 453/18 |
| 5,484,089 | A * | 1/1996 | Picerno | B65D 83/04 222/534 |
| 5,524,799 | A * | 6/1996 | Skillin | B65D 47/305 222/534 |
| 5,852,911 | A * | 12/1998 | Yuyama | B65B 35/04 53/168 |
| 5,873,463 | A * | 2/1999 | Purcell | B25H 3/023 206/372 |
| 5,907,493 | A | 5/1999 | Boyer et al. | |
| 5,921,383 | A * | 7/1999 | Shefler | A45C 11/04 206/38 |
| 6,098,241 | A * | 8/2000 | Wood | A47L 9/0018 15/323 |
| 6,219,587 | B1 | 4/2001 | Ahlin et al. | |
| 6,237,804 | B1 * | 5/2001 | Peery | G07F 11/44 221/152 |
| 6,259,654 | B1 * | 7/2001 | de la Huerga | A61J 1/1437 368/10 |
| 6,267,265 | B1 * | 7/2001 | Issa | A61J 7/0076 221/263 |
| 6,370,841 | B1 | 4/2002 | Chudy et al. | |
| 6,431,399 | B2 * | 8/2002 | Gabel | A61J 7/0084 221/263 |
| 6,494,776 | B1 * | 12/2002 | Molbak | G07D 1/04 453/32 |
| 6,561,379 | B1 * | 5/2003 | Goh | A61J 1/03 221/263 |
| 6,574,912 | B1 * | 6/2003 | Johnson | A01M 23/26 43/58 |
| 6,769,228 | B1 | 8/2004 | Mahar | |
| 6,817,481 | B2 * | 11/2004 | Alexander | E06B 7/28 109/67 |
| 6,948,634 | B2 * | 9/2005 | Evans | B65D 43/021 221/202 |
| 7,080,755 | B2 * | 7/2006 | Handfield | A61J 7/0084 221/13 |
| 7,182,105 | B1 * | 2/2007 | Feehan | B65B 5/103 141/18 |
| 7,207,464 | B2 * | 4/2007 | Brenner | B65D 83/049 221/247 |
| 7,225,597 | B1 * | 6/2007 | Knoth | B65B 5/103 53/244 |
| 7,360,669 | B2 * | 4/2008 | Drajan | B65D 83/0409 221/208 |
| 7,418,311 | B1 * | 8/2008 | Lagassey | G07F 9/026 221/150 R |
| 7,559,436 | B2 * | 7/2009 | Bieger | G07F 11/44 221/256 |
| 7,987,628 | B2 * | 8/2011 | Le Laidier | A01M 23/20 43/60 |
| 8,521,326 | B1 | 8/2013 | Holtje | |
| 8,657,155 | B2 * | 2/2014 | Dwork | B65D 83/0481 221/229 |
| 8,683,737 | B2 * | 4/2014 | Studer | A01M 23/08 43/58 |
| 8,833,603 | B1 * | 9/2014 | Balasubramanian | G07F 17/0092 221/200 |
| 8,944,282 | B2 * | 2/2015 | Kroupa | B65D 83/0409 221/154 |
| 9,073,206 | B2 * | 7/2015 | Carson | B25J 9/0096 |
| 9,238,518 | B2 * | 1/2016 | Luciano, Jr. | B65D 75/42 |
| 9,308,149 | B1 * | 4/2016 | Niskey, Jr. | A61J 1/03 |
| 2001/0034202 | A1 * | 10/2001 | Nottingham | G07D 3/04 453/3 |
| 2002/0162843 | A1 * | 11/2002 | Alley | B25H 3/023 220/524 |
| 2003/0196869 | A1 * | 10/2003 | Molbak | G07D 1/04 194/347 |
| 2004/0034447 | A1 | 2/2004 | Vollm et al. | |
| 2005/0194391 | A1 * | 9/2005 | Domke | A61F 15/001 220/835 |
| 2005/0263537 | A1 | 12/2005 | Gerold et al. | |
| 2006/0118573 | A1 | 6/2006 | Ganz et al. | |
| 2006/0138162 | A1 * | 6/2006 | Anderson | A61J 7/0076 221/288 |
| 2006/0201333 | A1 * | 9/2006 | Friel, Sr. | A47J 37/0611 99/372 |
| 2007/0032762 | A1 | 2/2007 | Vogel | |
| 2007/0113578 | A1 * | 5/2007 | Wu | F25C 5/182 62/344 |
| 2007/0125046 | A1 | 6/2007 | Siegel et al. | |
| 2007/0157548 | A1 * | 7/2007 | Knoth | B65B 5/103 53/244 |
| 2007/0181614 | A1 | 8/2007 | Rvachov et al. | |
| 2007/0185615 | A1 | 8/2007 | Bossi et al. | |
| 2007/0283821 | A1 * | 12/2007 | May | A47J 37/0611 99/372 |
| 2008/0029517 | A1 * | 2/2008 | Briers | B65D 25/06 220/495.01 |
| 2008/0093372 | A1 | 4/2008 | Milton et al. | |
| 2008/0223001 | A1 * | 9/2008 | Monti | B65B 5/105 53/246 |
| 2008/0271414 | A1 | 11/2008 | Yuyama et al. | |
| 2009/0120042 | A1 | 5/2009 | Zieher | |
| 2009/0138122 | A1 | 5/2009 | Wagner | |

(56) References Cited

U.S. PATENT DOCUMENTS

| | | | |
|---|---|---|---|
| 2009/0139189 A1* | 6/2009 | Yuyama | B65B 5/103 53/493 |
| 2010/0011715 A1* | 1/2010 | Freudelsperger | B65B 5/103 53/493 |
| 2010/0024662 A1* | 2/2010 | Bengtson | A47J 37/0611 99/377 |
| 2010/0042255 A1 | 2/2010 | Boutin et al. | |
| 2010/0287880 A1* | 11/2010 | Yasunaga | A61J 7/0084 53/64 |
| 2011/0202171 A1* | 8/2011 | Rosenbaum | G06F 19/3462 700/216 |
| 2011/0208352 A1* | 8/2011 | Knoth | B65B 5/103 700/243 |
| 2011/0278319 A1* | 11/2011 | Knoth | B65B 5/103 221/1 |
| 2011/0278329 A1* | 11/2011 | Enns | A47G 19/34 222/434 |
| 2012/0073241 A1 | 3/2012 | Mahar | |
| 2012/0259456 A1 | 10/2012 | Saltsov | |
| 2012/0305133 A1 | 12/2012 | Ansaloni et al. | |
| 2013/0001233 A1* | 1/2013 | Hylton | A47G 19/2272 220/592.2 |
| 2013/0018503 A1 | 1/2013 | Carson et al. | |
| 2013/0142406 A1 | 6/2013 | Lang et al. | |
| 2013/0218330 A1 | 8/2013 | Chudy et al. | |
| 2013/0284100 A1* | 10/2013 | MacKelvie | A01K 39/01 119/57.8 |
| 2013/0318931 A1 | 12/2013 | Holmes | |
| 2013/0340390 A1 | 12/2013 | Carson et al. | |
| 2014/0033658 A1* | 2/2014 | Habraken | B65D 25/04 53/467 |
| 2014/0096479 A1 | 4/2014 | Pearson et al. | |
| 2014/0230376 A1* | 8/2014 | Knoth | B65B 5/103 53/452 |
| 2015/0239664 A1* | 8/2015 | Liistro | B65F 1/1646 206/459.1 |
| 2015/0352574 A1* | 12/2015 | Kolb | B05B 11/0081 222/137 |
| 2016/0007799 A1* | 1/2016 | Steeb | A47J 37/0611 426/275 |
| 2016/0009490 A1* | 1/2016 | Scherer | B65F 1/02 220/523 |
| 2016/0104277 A1 | 4/2016 | Takamori | |
| 2016/0122045 A1* | 5/2016 | Kames | B65B 5/105 53/411 |
| 2016/0122060 A1 | 5/2016 | Sweet et al. | |
| 2016/0256639 A1 | 9/2016 | Van Sickle et al. | |
| 2017/0015445 A1 | 1/2017 | Holmes | |

FOREIGN PATENT DOCUMENTS

| | | |
|---|---|---|
| WO | 2016073360 A1 | 5/2016 |
| WO | 2016073512 A1 | 5/2016 |

OTHER PUBLICATIONS

International Patent Application No. PCT/US2015/058630, International Search Report and Written Opinion dated Jan. 12, 2016, 6 pages.

U.S. Appl. No. 14/532,853, Non-Final Office Action dated Mar. 8, 2017, 9 pages.

International Patent Application No. PCT/US15/58875, International Preliminary Report on Patentability dated May 9, 2017, 7 pages.

International Patent Application No. PCT/US2015/058630, International Preliminary Report on Patentability dated May 9, 2017, 6 pages.

EP15856733.9 received an Extended European Search Report dated May 29, 2018, 14 pages.

U.S. Appl. No. 14/532,853, Final Office Action, dated Sep. 1, 2017, 25 pages.

* cited by examiner

DISPENSING CANISTERS FOR PACKAGING ORAL SOLID PHARMACEUTICALS VIA ROBOTIC TECHNOLOGY ACCORDING TO PATIENT PRESCRIPTION DATA

BACKGROUND OF THE INVENTION

Field of the Invention

The present invention relates generally to the field of automated oral solid pharmaceutical packaging mechanisms for packaging oral solid pharmaceuticals in packages in accordance with patient prescription information. More specifically, the present invention is directed to systems and methods for automatically verifying placement of oral solid pharmaceuticals within packaging according to patient prescription data. A variety of systems and methods are disclosed which provide rapid and efficient verification of oral solid pharmaceutical product placement within packaging in accordance with patient prescription data. The systems and methods which are described below provide multiple independent verifications within a single piece of automation that ensure absolute confidence that the placement of oral solid pharmaceuticals within packaging strictly matches patient prescription dosing information.

Description of the Related Art

Currently, various automated packaging systems exist for placing oral solid pharmaceuticals into packaging solutions which correlate individual dosing times with patient prescription dated. Examples include U.S. Pat. Nos. 8,831,773 and 7,185,476 which are incorporated herein by reference. These issued patents describe systems that are capable of placing one or more oral solid pharmaceutical products into package cavities that correspond to patient prescription data and are herein incorporated by reference in their entirety. While the existing solutions describe various systems that are capable of rapidly and efficiently placing oral solid pharmaceuticals into packages, there remains a need in the art for ensuring that the oral solid pharmaceuticals have been precisely placed into the packages according to the patient prescription data with absolute confidence and within a single system. Currently there are no systems available that provide automatic verification that oral solid pharmaceutical packaging has been filled precisely according to patient prescription data within a single system and blister carded packaging. Accordingly, there remains a need in the field for systems and methods that are capable of ensuring that oral solid pharmaceuticals have been placed strictly in accordance with predetermined patient prescription data within a single system and in blister carded packaging.

The conventional approach to solving this issue requires that a trained technician or pharmacist review the packaged pharmaceuticals in order to ensure that the oral solid pharmaceutical products have been properly placed within the packaging material. The conventional approach is prone to errors and significant delays associated with the manual review process. Applicants' innovation that is set forth below overcomes these deficiencies of existing systems and obviates the need for post packaging quality review. Applicants' unique use and arrangement of various sensors ensures that the oral solid pharmaceuticals have been packaged properly.

SUMMARY OF THE PRESENT INVENTION

In accordance with a first preferred exemplary embodiment of the present invention, robotic pick-and-place automation is used to transfer oral solid pharmaceuticals from moveable trays or canisters that have been quality checked by a pharmacist to package locations in accordance with patient prescription data. Advantageously, in accordance with the present invention, a variety of sensors are used in order to verify that the oral solid pharmaceuticals have been properly placed in the desired oral solid pharmaceutical package locations precisely according to the patient prescription data. In accordance with a first preferred embodiment of the present invention, a pharmacist places oral solid pharmaceutical products within dispensing trays or canisters which are used to present the oral solid pharmaceutical products for picking and placing via the robotic pick-and-place machinery. Once the canister or tray is located adjacent the pick-and-place device, a further sensor or imaging unit associated with the pick-and-place device verifies that the oral solid pharmaceutical product presented by the tray or canister matches the size and shape and/or color of an expected oral solid pharmaceutical product that is to be placed within the packaging material in accordance with patient prescription data that is stored by a computer associated with the system.

If the expected data matches the actual oral solid pharmaceutical product sensed by the imaging unit associated with the pick-and-place device, the robotic pick-and-place continues to transfer one oral solid pharmaceutical product to a desired package location which has a dosing time corresponding to the patient prescription data that is for the package that is currently being filled. Once the robotic pick-and-place end of arm tooling has transferred the oral solid pharmaceutical product to the desired package location, additional sensing units ensure that the transfer is completed into the desired package location in order to verify that the robotic pick-and-place unit has dropped the oral solid pharmaceutical product into a desired package location. If the imaging sensor of the robotic pick-and-place device determines that the oral solid pharmaceutical product presented at the tray or canister is not a match to the expected oral solid pharmaceutical product according to the current patient prescription data, then the system issues an alert to the system operator in order to prevent the erroneous transfer of oral solid pharmaceutical products into the packaging material and will not pick that oral solid pharmaceutical.

In accordance with a preferred exemplary embodiment of the present invention, a med verification tray or transfer sensing unit is located between the end of arm tooling for the robotic pick-and-place mechanism and a oral solid pharmaceutical product package or temporary store having cavity locations corresponding to the cavities of a solid pharmaceutical package that is to be filled by the system. The med verification tray or transfer sensing unit preferably includes a plurality of sensors that operate to confirm transfer from the robotic pick-and-place end of arm tooling into the package cavity location corresponding to the prescription data that is currently being filled by the system. It is preferred that the system is able to ensure that a specific cavity location is being filled by confirming the drop of the oral solid pharmaceutical from the robotic pick-and-place end of arm tooling.

In accordance with a first preferred exemplary embodiment of the present invention, one or more optical sensing units are used to ensure that the oral solid pharmaceutical product that is transferred by the robotic pick-and-place device actually drops into the specific package cavity location that is to be filled by the system. In a first preferred exemplary embodiment, an optical sensor unit includes an emitter that emits a wide beam that at least substantially covers a region above the cavity location that is to be filled. One or more receiving units are located opposite the emitting unit and sense the emitted beam generated by the emitter. An interrupt signal is generated when the one or more receiving units sense that at least a portion of the beam has been interrupted. Because the emitter and receiving unit are preferably individually associated with each package cavity location, it is possible to confirm that an oral solid pharmaceutical has been transferred by the robotic pick-and-place unit from the dispensing tray or canister specifically into a desired oral solid pharmaceutical package cavity location corresponding to the patient prescription data. This technique ensures strict compliance for packaging oral solid pharmaceutical products in accordance with stored patient prescription data. It is also preferred that the sensors of the med verification tray or transfer sensing unit preferably sense any additional breach of the beam immediately after the drop of the oral solid pharmaceutical product in order to ensure that the oral solid pharmaceutical product does not bounce from the desired oral solid pharmaceutical packaging location when the oral solid pharmaceutical product is dropped by the robotic pick-and-place device.

A further verification may also be performed by imaging the packaged pharmaceuticals and matching the oral solid pharmaceutical products located within each package cavity with the corresponding patient prescription data for the specific dosing time corresponding to the package cavity location. In accordance with the foregoing verifications, it is possible to ensure that the individual oral solid pharmaceutical package cavities have been filled with the appropriate doses corresponding to predetermined patient prescription data with absolute confidence. Conventional systems have not been able to provide this high level of confidence for the existing automated oral solid pharmaceutical packaging systems. The present invention overcomes these shortcomings and deficiencies of the existing systems thereby providing a much more economical and efficient packaging solution.

DETAILED DESCRIPTION OF THE PRESENTLY PREFERRED EMBODIMENTS

Figure 1:
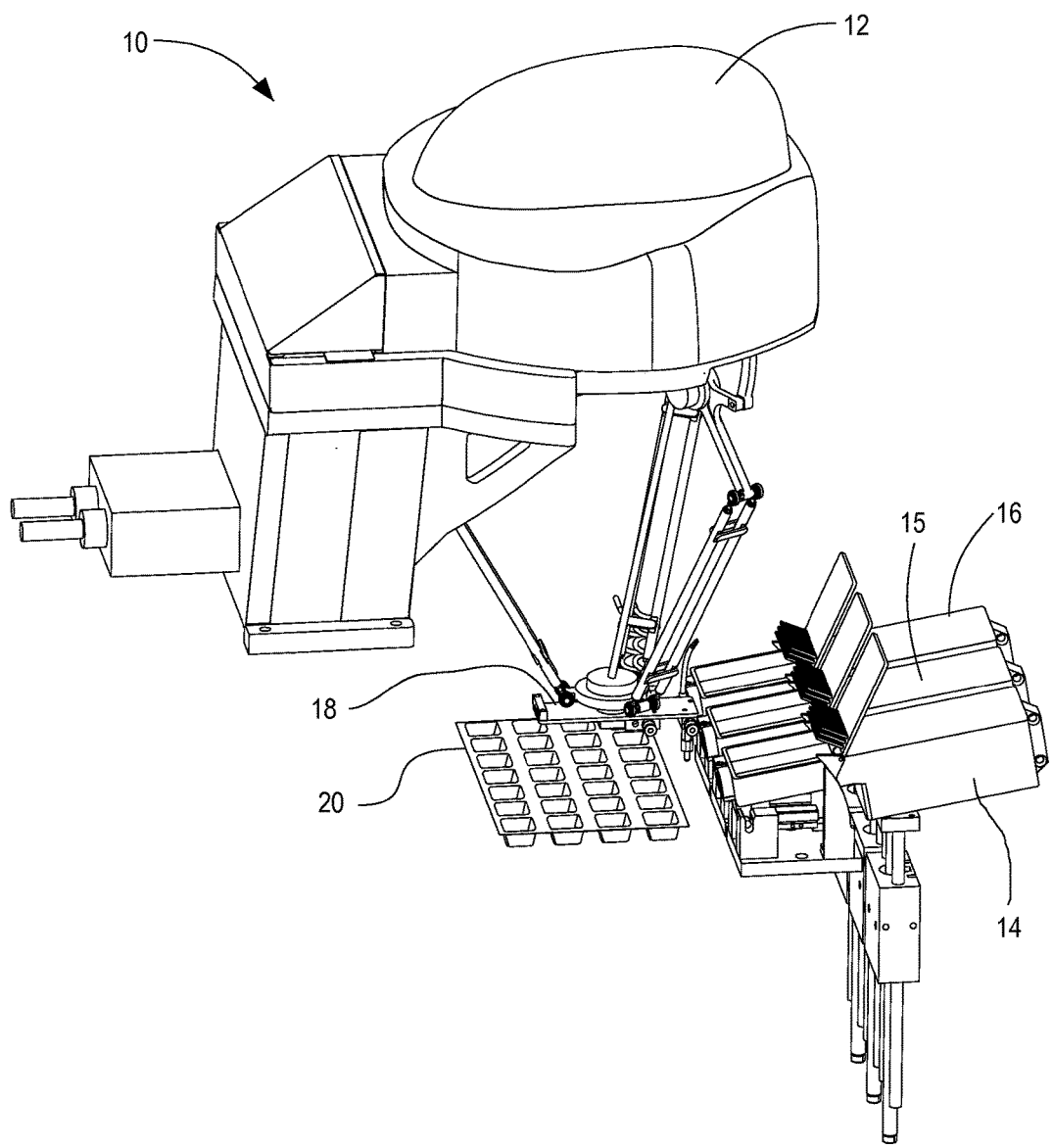
FIG. 1 illustrates a first exemplary embodiment of the overall robotic pick-and-place oral solid pharmaceutical packaging system of the present invention.

FIG. 1 illustrates a first preferred exemplary embodiment of the present invention which is generally shown at 10 in the illustration. A robotic pick-and-place unit 12 transfers oral solid pharmaceutical products from the transfer trays or cassettes 14, 15, 16 into individual oral solid pharmaceutical package locations in accordance with patient prescription data. The individual transfer trays or cassettes 14, 15, 16 are preferably transferred to the respective locations shown in the illustration by another transfer robot from a staging location at which a pharmacist or technician fills the individual trays or cassettes from bulk storage. An initial verification is provided by a pharmacist or technician in order to ensure that the medications placed into the transfer trays or cassettes 14, 15, 16 match the medication designated for a specific transfer tray or cassette. Bar coding verification or other automatically verified visual coding is preferably used by the automated system in order to confirm that an individual tray or cassette that is staged adjacent the robotic pick- and place unit 12 for filling matches the designation provided by the pharmacist or technician at the time of filling.

An additional verification of the oral solid pharmaceutical is performed by an imaging unit (not shown) that is preferably associated with the end of arm tooling portion 18 of the robotic pick-and-place unit 12. The imaging unit provides image data for comparison with a library of image data that is used to ensure the oral solid pharmaceutical actually picked up by the robotic pick- and place unit 12 matches an expected oral solid pharmaceutical designated by a prescription to be filled based on a plurality of visual characteristics including one or more of shape, size, and/or color of the solid oral pharmaceutical. The imaging unit is also preferably used in order to ensure that the end of arm tooling is placed properly above a specific oral solid pharmaceutical so that the suction tip is able to grab and move an individual solid pharmaceutical. An automated processing unit compares the actual image data with expected image data to determine whether there is a match, if there is no match then an alert is issued to the system operator.

In accordance with a preferred exemplary embodiment, the end of arm tooling initially engages a suction tip that is secured to the transfer tray or cassette from which a solid oral pharmaceutical is to be transferred for packaging. The suction tip is a soft rubber end that is engaged and removed from the end of arm tooling at each cassette so that each cassette or transfer tray has its own dedicated suction tip thereby avoiding the potential for cross-contamination from different medications that are filled by the system. Once all medications have been transferred from a particular transfer tray or cassette for a particular package that is being filled by the system, the suction tip of the end of arm tooling is again secured to its corresponding transfer tray or cassette so that it is available for use the next time that a solid oral pharmaceutical is to be transferred from the transfer tray or cassette. The round suction tip is preferably temporarily secured at the transfer tray or cassette via a plastic semicircular structure so that the end of arm tooling can easily engage and disengage the suction tip of each cassette or transfer tray.

FIG. 1 also illustrates the location of the med transfer verification unit 20 that is placed above a package or package template that is to be filled by the system. The med transfer verification unit 20 incorporates a plurality of sensors that verify the transfer into a specific package or package template cavity corresponding to a patient prescription that is filled by the system.

Figure 2:
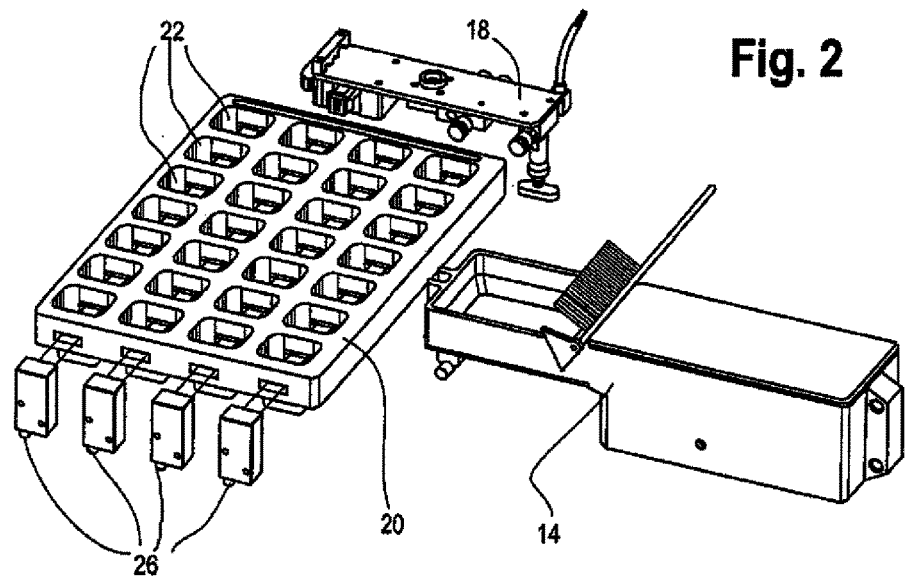
FIG. 2 illustrates a first exemplary embodiment of the med verification tray or transfer sensing unit of the present invention.

FIG. 2 illustrates a first exemplary embodiment of the med transfer verification unit 20. The med transfer verification unit 20 preferably includes an array of cavities 22 that each individually provide a transfer path for a solid oral pharmaceutical that is packaged by the system of the present invention. The array of cavities 22 of the med transfer verification unit 20 preferably correspond with the individual cavities of an oral solid pharmaceutical product package that is located beneath the med transfer verification unit 20. Each cavity of the package or package template corresponds with a specific patient dosing time and the system automatically transfers each required oral solid pharmaceutical into its specified location strictly in accordance with predetermined patient prescription data using the robotic pick-and-place unit.

FIG. 2 also illustrates a plurality of electromagnetic emitter units 26 that are used to verify that medication transferred by the robotic pick-and-place unit actually drops into a desired package cavity or template location. In accordance with this first embodiment, an electromagnetic energy receiving unit (not shown) is placed opposite each of the electromagnetic emitting units and a path is formed in the med transfer verification unit 20 through the oral solid pharmaceutical transfer path for each cavity in a given row or column of the med transfer verification unit 20 in order to confirm that an oral solid pharmaceutical has been deposited in a desired cavity according to the predetermined patient prescription data. In accordance with this first embodiment of the med transfer verification unit 20, it is possible to verify that an oral solid pharmaceutical has been deposited by the end of arm tooling but verification is only possible for rows or columns of the med transfer verification unit 20. Those skilled in the art will appreciate that additional emitters and receivers can be used in order to provide greater resolution for pill drop verification into each individual cavity. The med transfer verification unit 20 also acts as a barrier between cavities to prevent inadvertent transfer of the medication between the cavities.

Figure 3:
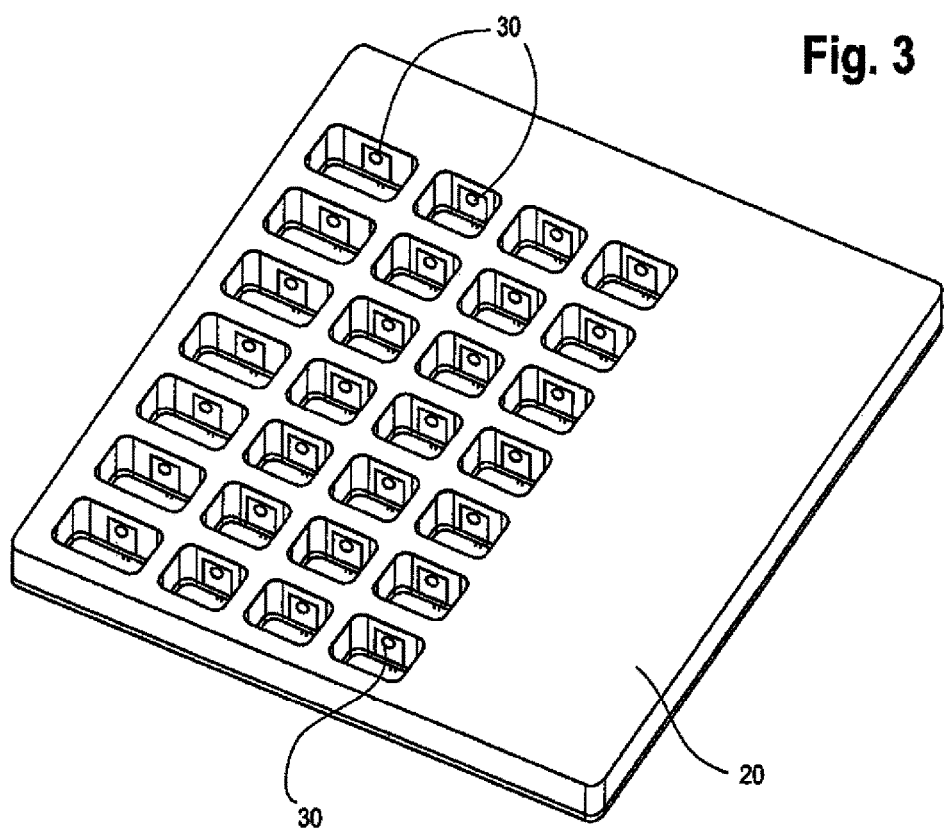
FIG. 3 illustrates a second exemplary embodiment of the med verification tray or transfer sensing unit of the present invention.

FIG. 3 illustrates an alternate embodiment of the med transfer verification unit 20 wherein each cavity 22 of the med transfer verification unit 20 includes its own pair of electromagnet emitter and receiver units for specifically confirming that a solid oral pharmaceutical has been dropped into a specific cavity of a package in accordance with patient prescription data. The electromagnetic emitter units are not shown in the illustration of FIG. 3. FIG. 3 illustrates the med transfer verification unit 20 and the individual electromagnetic receiving units 30 that are individually associated with each cavity of the med transfer verification unit 20. When an individual solid oral pharmaceutical is dropped by the robotic pick-and-place unit through a specific cavity of the med transfer verification unit 20, the med transfer verification unit 20 is able to sense and verify the drop of the solid oral pharmaceutical based on a break in the beam that is received by each of the electromagnetic receiving units 30. This sensing of the drop at each individual cavity provides confirmation that the oral solid pharmaceutical that has been dropped by the robotic pick-and-place unit into the package strictly in accordance with the predetermined patient prescription data. The individual electromagnetic emitters and receivers can also be used to ensure that pills have not bounced out from the cavities by verifying that only a single break in the beam is associated with each pill drop.

Additional image data from optical sensing units positioned above and/or below the package cavity may be used to further confirm that each individual cavity has been properly filled with the oral solid pharmaceuticals strictly in accordance with the predetermined patient prescription data.

Figure 4:
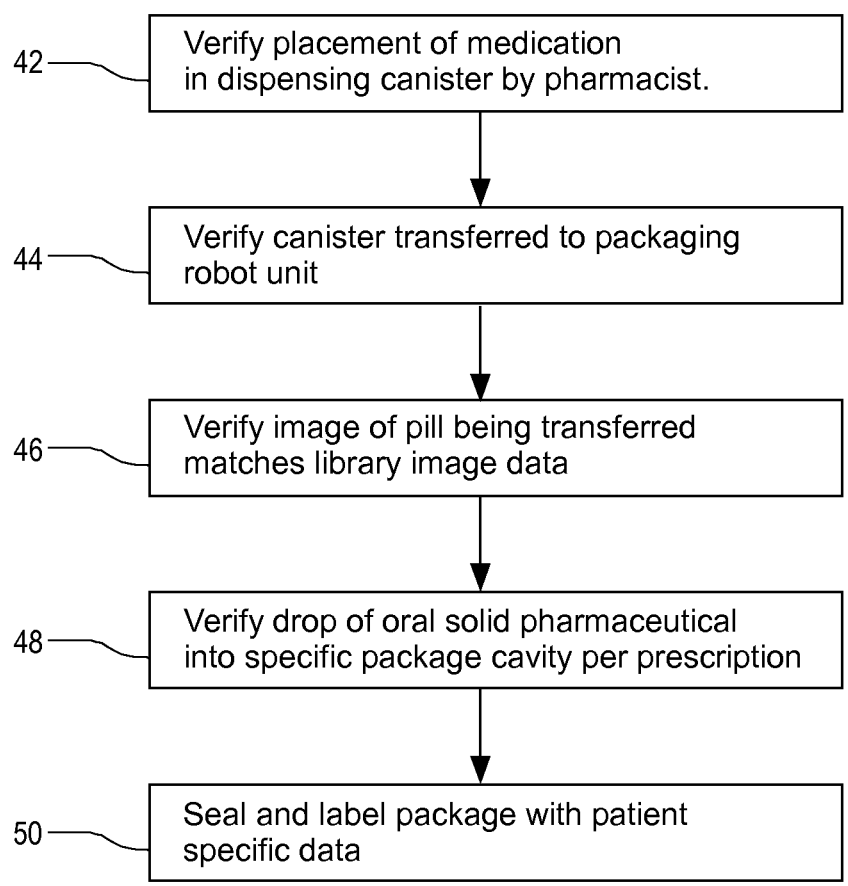
FIG. 4 is a flow diagram illustration of the verification process.

FIG. 4 is a flow diagram which illustrates the overall process for automatically verifying the placement of oral solid pharmaceutical products into specific cavities of a package strictly in accordance with patient prescription data stored in an electronic memory of a computer controller that is used for controlling the packaging machinery. In step 42 a pharmacist or technician verifies transfer of medication from bulk storage into the appropriate canister or dispenser for the specified medication. The medication canister is returned to a carousel where it can be automatically retrieved by a robot for transfer to the robotic pick-and place device of the present invention. It is preferred that a bar code, QR code or rfid reader associated with the system reads a code on the canister before it is positioned at a specific location in a staging area so a robotic retriever can transfer the desired canister automatically to the robotic pick-and-place unit.

In step 44, a bar code or other automated reader reads a code or data from the canister when it is transferred to the staging area of the robotic pick-and-place packaging system in order to ensure that the system transfers the desired medication. In step 46, image data from the pick-and-place unit verifies that the individual pill being transferred has physical characteristics matching those of the expected pill. In step 48, the system verifies drop of the pill into the specific package cavity corresponding to the patient prescription data. Finally, in step 50, the resultant package is labeled and sealed with the patient specific data after all required medications for all doses specified by patient prescription data have been filled by the system into the cavities of the product package.

In an alternate more manual version of the system, the med transfer verification tray includes one or more lights that illuminate at a region of the tray corresponding to a specific cavity of the package that is to be filled with an oral solid pharmaceutical. This assists in the manual transfer of oral solid pharmaceuticals into specific package cavities according to patient prescription data. The remaining operations associated with pill transfer can then be performed in accordance with manual transfer into a package cavity. The system cause one or more lights in a specific region to illuminate in order to guide the user to place a solid pharmaceutical in a desired package location corresponding to patient prescription data.

Figure 5:
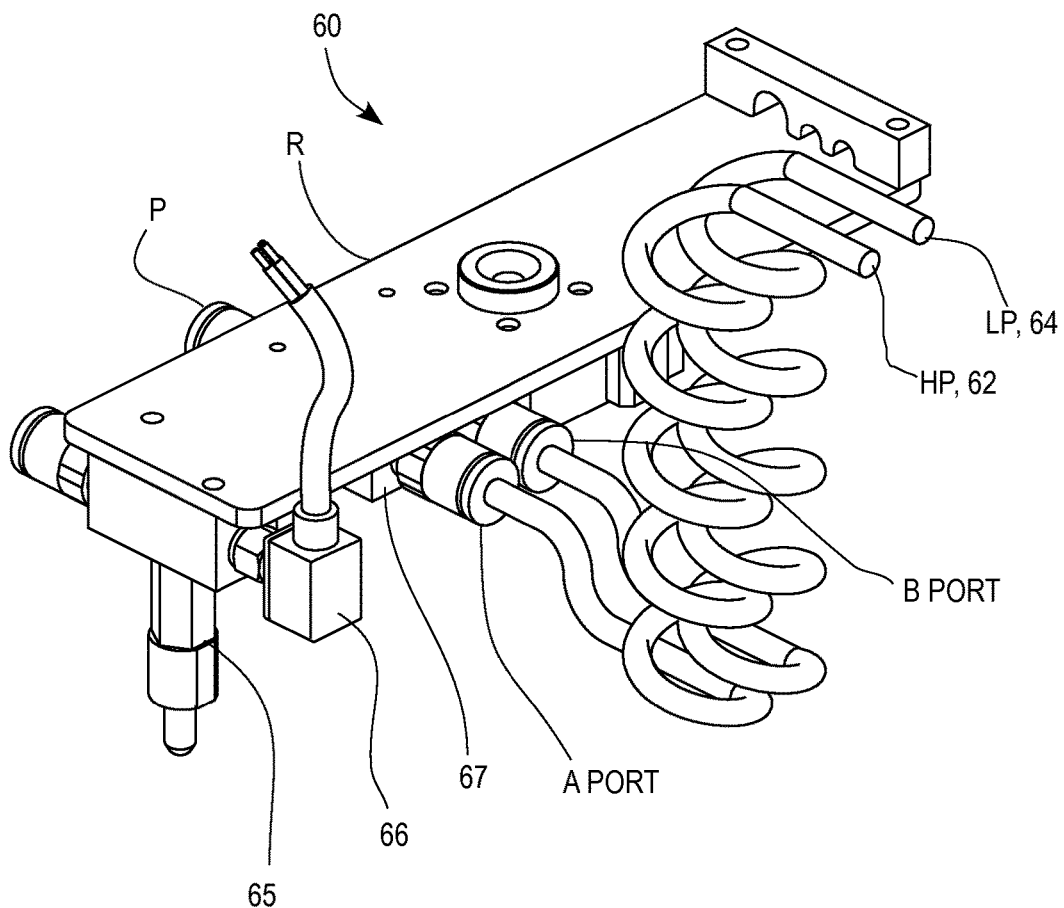
FIG. 5 illustrates the end of arm tooling for the robotic pick-and-place device.

FIG. 5 illustrates the details of the end of arm tooling for the robotic pick-and-place device which is shown generally at 60. High pressure and low pressure lines 62 and 64 operate to generate a vacuum at the suction tube 65. A pressure sensor 66 located proximate the suction tube 65 operates to ensure that a pill has been picked up by the system based on a predetermined pressure change at the pressure sensor 66. A valve 67 is a pneumatic solenoid switch that selectively applies the vacuum at the suction tube 65. The switch is preferably a 2 msec switch which causes the pressure change within 10 msec at the suction tube end within 10 msec. The solenoid switch or valve 67 consists of four standard ports and the port A and B are the supply of negative pressure and positive pressure. Port A is directly coupled to the vacuum ejector which supplies the negative pressure and port B is directly coupled to a positive pressure regulator which supplies low positive pressure. As a result, the P port is the port which supplies the vacuum pressure and the positive pressure to the suction tube. Ports A and B always have the vacuum and positive pressure active during picking and placing operations. This arrangement assures rapid pressure changes at the end of the suction tube 65. The positive pressure is required to simply and effectively remove the vacuum pressure at the end of suction tube 65.

For performing pill drop verification, it is preferred to use emitters such as model LV S 62 manufactured by Keyence as an optical emitter along with an optical sensor. Alternatively a Fairchild semiconductor infrared emitting diode can be used as the light source in conjunction with an optical sensor. Those skilled in the art will appreciate that virtually any emitter and sensor can be used to sense a break in the sensed emission beam associated with the transit of an oral solid pharmaceutical into a product package cavity. In an alternate arrangement, it is recognized that one or more imaging units could be used to sense the transit of oral solid pharmaceuticals into package cavities but this arrangement requires additional image data processing in order to identify transfer into a specific package cavity.

Figure 6:
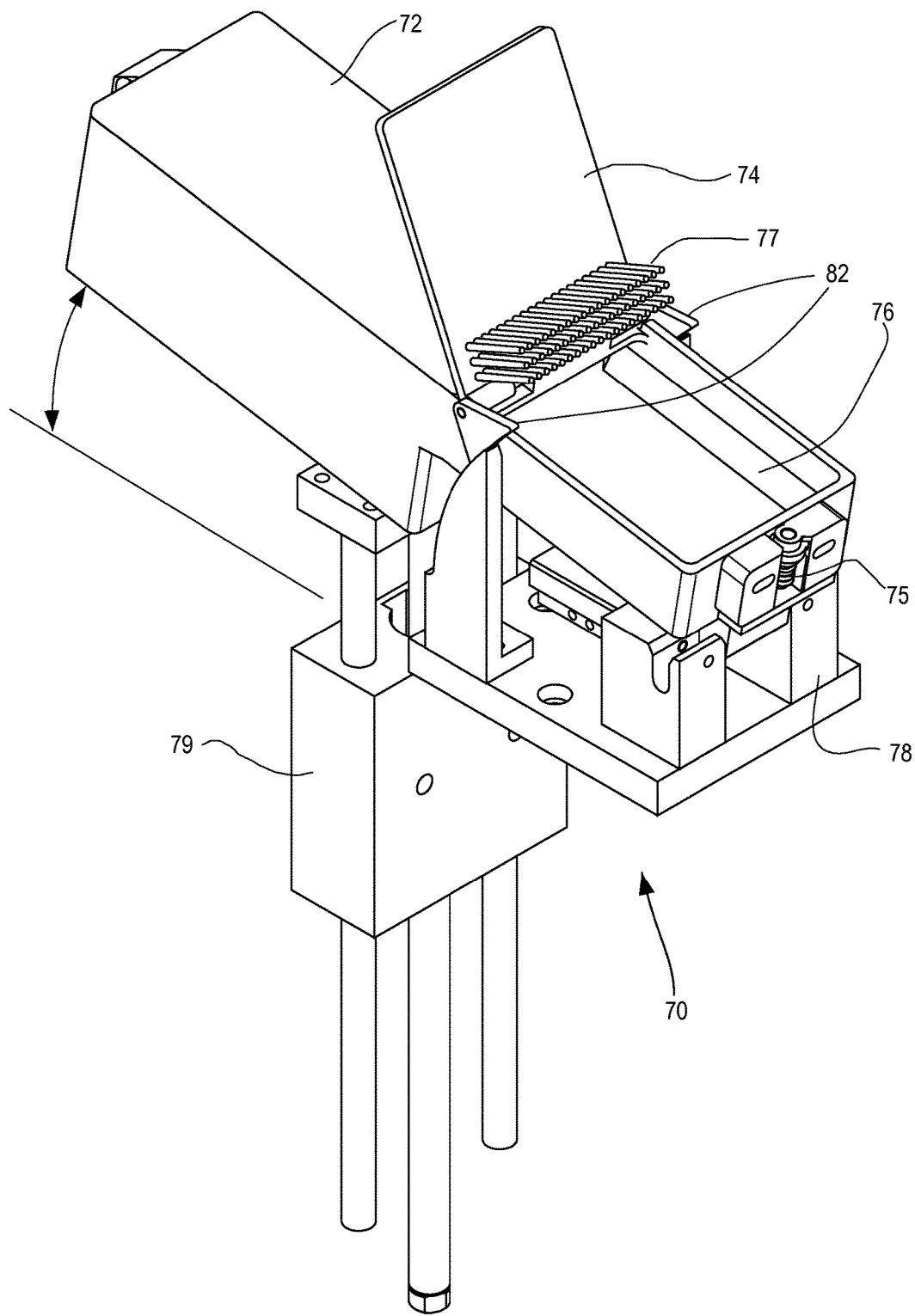
FIG. 6 illustrates a dispensing canister with its lid in the open position.

FIG. 6 illustrates placement of a dispensing canister or cassette at the staging area of the robotic pick-and-place system generally at 70. The cassette 72 includes a rotating lid portion 74 and the removable rubber tip 75 for the end of the suction tube of the robotic pick- and place device. The removable rubber or neoprene tip 75 is secured into a plastic locking member based on the resilient nature of the rubber or neoprene tip 75 and the shape of the locking member which is preferably semi-cylindrical in order to match the contour of the removable rubber or neoprene tip 75. After the dispensing canister or cassette 72 is secured into the staging area of the robotic pick-and-place system, the suction tube of the robotic pick-and-place system is inserted into the removable rubber or neoprene tip 75. Each dispensing canister or cassette preferably includes its own removable rubber or neoprene tip to ensure that there is no cross-contamination of medicines via the system. Each medication therefore has its own removable rubber or neoprene tip and cross-contamination is eliminated.

The dispensing canister or cassette 72 includes a vision region 76 at which medications are picked up by the robotic pick-and-place unit. The rotating lid portion 74 includes a barrier portion 77 that separates medications from a storage region during transit of the dispensing canister or cassette 72. A locking base portion 78 mechanically secures the dispensing canister or cassette 72 based on interaction with a protruding portion of the dispensing canister or cassette 72. Those skilled in the art will appreciate that a variety of known mechanical and electro-mechanical locking mechanisms may be used to secure the dispensing canister or cassette 72 to the staging area.

Each location of the staging area includes a linear motor 79 for adjusting a resting angle of the dispensing canister or cassette 72 when secured to the staging area. In addition to adjusting the resting angle of the dispensing canister or cassette 72, the linear motor 79 selectively causes vibration of the dispensing canister or cassette 72 in order to shake solid oral pharmaceuticals from a storage region of the dispensing canister or cassette 72 to the vision region 76 so that the robotic pick-and-place unit can conveniently grab solid oral pharmaceuticals from the vision region for placement in packaging as described above. A digital imaging unit that is preferably secured to the end of arm tooling for the robotic pick-and-place unit guides the suction tube and the removable rubber or neoprene tip 75 in order to properly secure a solid oral pharmaceutical located in the vision region 76 for transfer to a package.

The preferred angle of tilt provided by the linear motor 79 for the dispensing canister or cassette 72 in order to easily transfer solid oral pharmaceuticals from a storage portion to the vision portion of the dispensing canister or cassette 72 depends on a number of factors. The factors considered in selecting an appropriate tilt angle include the relative fill level for the storage portion of the dispensing canister or cassette 72. Greater fill indicates less tilt and when the dispensing canister or cassette 72 is almost empty, a greater tilt must be provided. Additional factors that should be considered in making this determination include the slope of the internal ramp connecting the storage region and the vision region 76 of the dispensing canister or cassette 72 as well as the size and shape of the medications that are stored by the dispensing canister or cassette 72. Generally, a tilt of approximately 10-20 degrees is preferable for transferring the oral solid pharmaceuticals to the vision region by vibration.

It is preferred that the system monitors the number of solid oral pharmaceuticals in the dispensing canister or cassette 72 so that the angle of tilt can be dynamically altered in order to provide the most desirable transfer of solid pharmaceuticals into the vision region 76 of the dispensing canister or cassette 72. This is accomplished by noting when the technician or pharmacist has filled the dispensing canister or cassette 72 and the pill count is then decremented based on the number of oral solid pharmaceuticals that have been packaged by the robotic pick-and-place unit from a particular canister.

The amount of vibration provided by the linear motor 79 also depends on a number of factors including pill size, shape and weight. It is preferred that a database be maintained by the system so that an electronic controller may access an electronic memory having this stored information so that the controller can selectively operate the linear motor 79 at a desired tilt angle and at a desired vibration in order to conveniently transfer medications from the storage region to the vision region of the dispensing canister or cassette 72. The vibration amplitude is typically a few tenths of a millimeter and the duration is typically a fraction of a second to several seconds at a frequency of a few kilohertz. A database should be maintained which stores the most desirable transfer characteristics for the linear motor 79 including tilt, and vibration parameters.

A mechanical cam 82 preferably engages a static arm of the staging area for the robotic pick-and-place unit so that placement of the dispensing canister or cassette 72 in the staging area causes opening of the rotating lid portion 74 and a barrier portion 77 when the dispensing canister or cassette 72 is placed in the staging area of the robotic pick-and-place unit. This arrangement is very efficient and eliminates the need to open the lid portion 74 with a separate motion of a robot.

Figure 7:
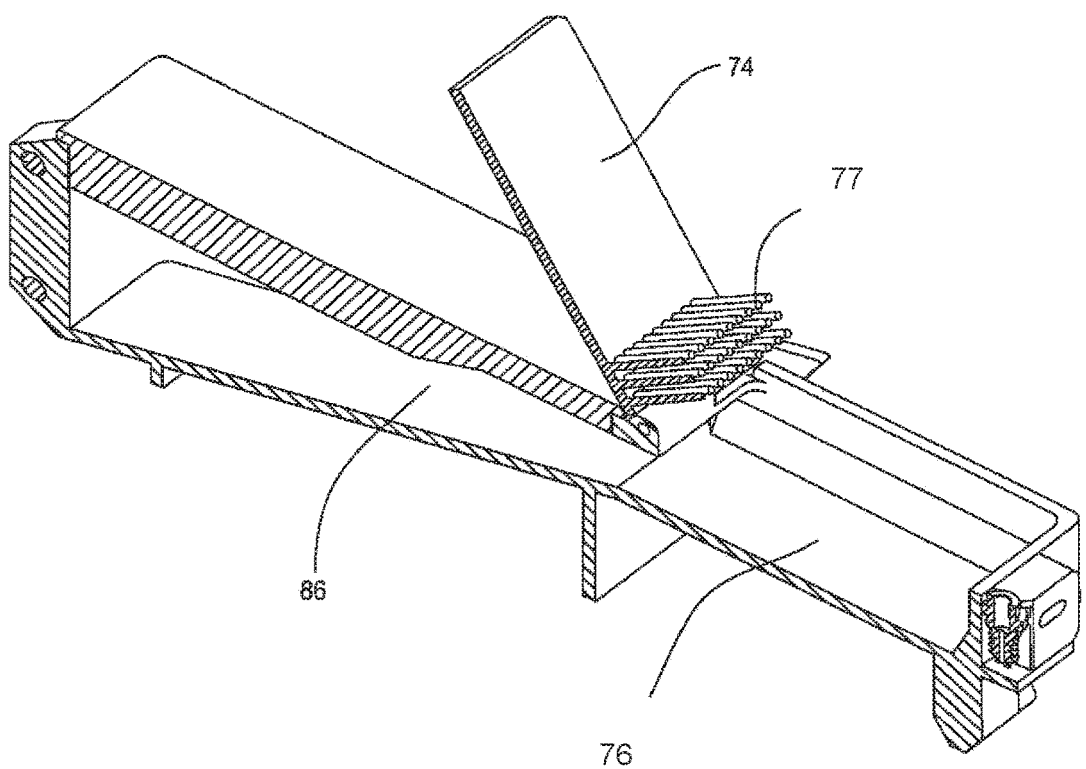
FIG. 7 is a cut-away illustration of the dispensing canister illustrated in FIG. 6.

FIG. 7 is a cut-away view of an exemplary dispensing canister or cassette 72. Gripping structures 81 are used by the transfer robot to transfer the dispensing canister or cassette 72 to the staging area of the robotic pick-and-place unit. This view clearly illustrates the vision region 76 and the storage region 86 with the sloped bottom between the vision region and the storage region 86. The sloped arrangement of the bottom for the storage region 86 enables convenient transfer of the oral solid pharmaceuticals from the storage region 86 to the vision 77 based on tilt and vibration of the dispensing canister or cassette 72 as noted above.

Figure 8:
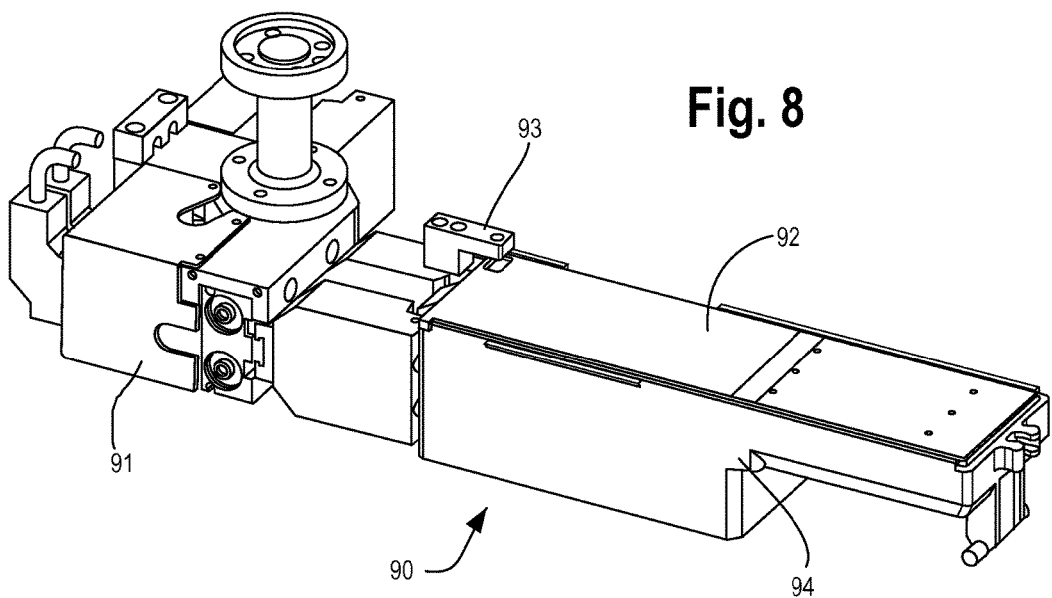
FIG. 8 illustrates robotic transfer of a dispensing canister.

FIG. 8 illustrates an alternate arrangement for the dispensing canister or cassette which is generally shown at 90. FIG. 8 also illustrates the end of arm tooling 91 for the robotic unit that transfers the dispensing canister or cassettes from storage locations to the staging region of the robotic pick-and-place unit. According to this alternate arrangement, the dispensing canister or cassette includes a sliding lid 92 which the end of arm tooling for placement the dispensing canister or cassette engages via arm 93 once the canister has been placed in the staging area in order to slide open the sliding lid 92. The barrier that is attached to the lid engages an end of the vision region shown at 94 in order to ensure that medications do not inadvertently fall into the vision region during transit. This ensures that the vision region maintains a single layer of solid oral pharmaceuticals which can be easily grabbed via the end of arm tooling for the robotic pick-and-place unit.

Figure 9:
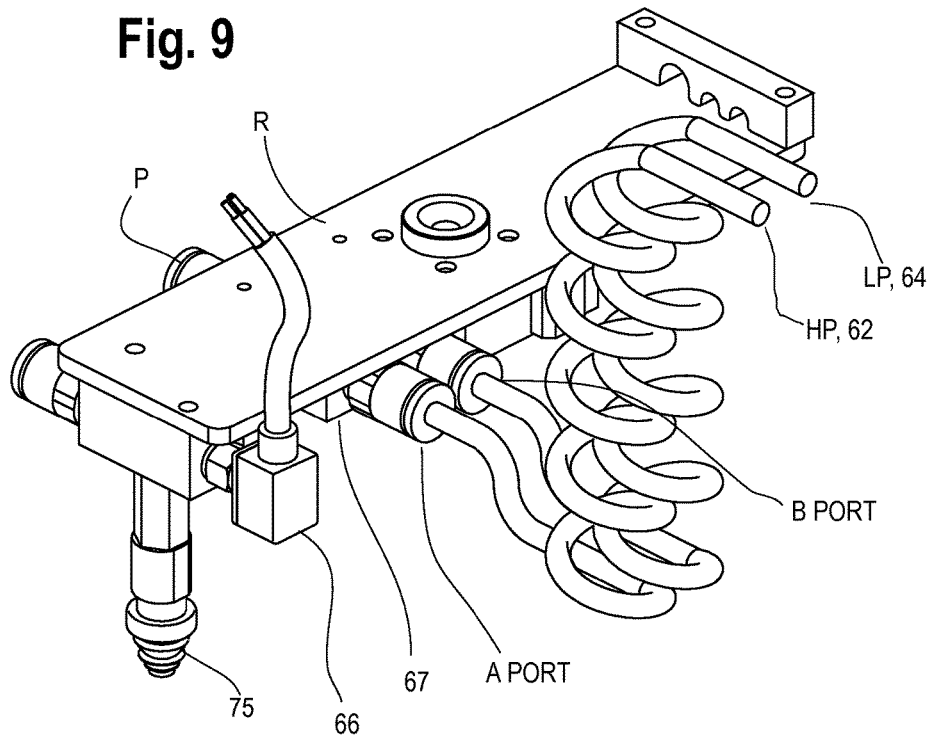
FIG. 9 illustrates the robotic pick-and-place end of arm tooling with the removable suction tip secured for pill transfer.

FIG. 9 illustrates the robotic pick-and-place end of arm tooling and the removable rubber or neoprene tip 75 secured to the suction tip for grabbing medications. The pressure sensor located at the end of arm tooling adjacent the suction tip is preferably monitored during pill transit in order to ensure that there is no inadvertent drop of the pill during transit before the pill is place in the container.

Those skilled in the art will appreciate that various substitutions and alterations can be made to the systems and methods described in the instant application while still falling within the scope of the appended claims.

We claim:

1. A dispensing container for robotic pick-and-place packaging of solid oral pharmaceuticals comprising:
   a continuous interior bottom surface forming a base of a solid pharmaceutical reservoir portion and a pick-and-place staging area, wherein:
      the solid pharmaceutical reservoir portion has a volume that is sufficient to hold a plurality of solid pharmaceuticals; and
      the pick-and-place staging area is adjacent the reservoir portion and provides a flat surface; and
   a hinged lid comprising a fixed portion which covers the reservoir portion and a movable portion which covers the staging area when the hinged lid is in a closed position, the movable portion comprising a barrier that extends downward from the hinged lid and separates the reservoir portion from the staging area when the hinged lid is in the closed position to prevent transfer of solid pharmaceuticals from the reservoir portion to the staging area, wherein:
      when the hinged lid is in an open position the movable portion moves to:
      expose the staging area while the reservoir portion remains covered by the fixed portion; and
      move the barrier such that the reservoir portion and the staging area form a single volume; and
      the dispensing container is configured to be tilted while the hinged lid is in an open position, thereby allowing solid pharmaceuticals to be transferred from the reservoir portion to the staging area.

2. The dispensing container for robotic pick-and-place packaging of solid oral pharmaceuticals of claim 1, further comprising a suction tip holder portion that temporarily secures a suction tip for the robotic pick-and-place device so that the robotic pick-and-place suction tip is covered by a suction tip corresponding to its respective dispensing canister when transferring solid pharmaceuticals from the dispensing container thereby prevent cross-contamination by using suction tips with different medications.

3. The dispensing container for robotic pick-and-place packaging of solid oral pharmaceuticals of claim 1, further comprising a linear motor for vibrating the dispensing container in order to transfer solid pharmaceuticals from the reservoir portion to the staging area.

4. The dispensing container for robotic pick-and-place packaging of solid oral pharmaceuticals of claim 3, wherein: the linear motor is further configured to tilt the dispensing container.

5. The dispensing container for robotic pick-and-place packaging of solid oral pharmaceuticals of claim 3, wherein:
   an amount of vibration provided by the linear motor is based on one or more of a size of each solid pharmaceutical, a shape of each solid pharmaceutical, and a weight of each solid pharmaceutical.

6. The dispensing container for robotic pick-and-place packaging of solid oral pharmaceuticals of claim 1, wherein:
   an angle of tilt of the dispensing container is dynamically altered based on a number of the solid pharmaceuticals present in the dispensing container.

7. The dispensing container for robotic pick-and-place packaging of solid oral pharmaceuticals of claim 1, wherein:
   the hinged lid comprises a mechanical cam that is configured to engage a static arm of the robotic pick-and-place device, wherein the engagement of the mechanical cam and the static arm opens the hinged lid.

8. The dispensing container for robotic pick-and-place packaging of solid oral pharmaceuticals of claim 1, wherein:
   a bottom surface of the reservoir portion is sloped toward the staging area.

9. The dispensing container for robotic pick-and-place packaging of solid oral pharmaceuticals of claim 1, wherein:
   the barrier is configured to permit access between the reservoir portion and the staging area when the hinged lid is in an open position.

10. A dispensing container for robotic pick-and-place packaging of solid oral pharmaceuticals, comprising:
   a continuous interior bottom surface forming a base of a solid pharmaceutical storage region and a vision region, wherein:
      the solid pharmaceutical storage region has a volume that is sufficient to hold a plurality of solid pharmaceuticals; and
      the vision region is adjacent the storage region and provides a flat surface; and
   a hinged lid comprising a fixed portion which covers the storage region and a movable portion which covers the vision region when the hinged lid is in a closed position, the movable portion comprising a barrier that extends downward from the hinged lid and separates the storage region from the vision region when the hinged lid is in the closed position to prevent transfer of solid pharmaceuticals from the storage region to the vision region, wherein:
      when the hinged lid is in an open position the movable portion moves to:
      expose the vision region while the storage region remains covered by the fixed portion; and
      move the barrier such that the storage region and the vision region form a single volume.

11. The dispensing container for robotic pick-and-place packaging of solid oral pharmaceuticals of claim 10, wherein:
   the solid pharmaceuticals are transferred from the storage region to the vision region by one or more of tilting the dispensing container.

12. The dispensing container for robotic pick-and-place packaging of solid oral pharmaceuticals of claim 10, wherein:
   the dispensing container is configured to be tilted, vibrated, or both tilted and vibrated by a linear motor of a staging area of the robotic pick-and-place device.

13. The dispensing container for robotic pick-and-place packaging of solid oral pharmaceuticals of claim 10, wherein:
   the hinged lid comprises a mechanical cam that is configured to engage a static arm of a staging area of the robotic pick-and-place device, wherein the engagement of the mechanical cam and the static arm opens the hinged lid.

14. The dispensing container for robotic pick-and-place packaging of solid oral pharmaceuticals of claim 10, wherein:
   a bottom surface of the storage region is sloped toward the vision region.

15. The dispensing container for robotic pick-and-place packaging of solid oral pharmaceuticals of claim 10, wherein:
   the barrier is configured to permit access between the storage region and the vision region when the hinged lid is in an open position.

\* \* \* \* \*